(12) United States Patent
Kim

(10) Patent No.: US 10,775,918 B2
(45) Date of Patent: Sep. 15, 2020

(54) FORCE TOUCH METHOD IN TOUCH INPUT DEVICE BASED ON A REFERENCE PRESSURE

(71) Applicant: HiDeep Inc., Gyeonggi-do (KR)

(72) Inventor: Seyeob Kim, Gyeonggi-do (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 15/657,745

(22) Filed: Jul. 24, 2017

(65) Prior Publication Data

US 2018/0046304 A1 Feb. 15, 2018

(30) Foreign Application Priority Data

Aug. 11, 2016 (KR) .................. 10-2016-0102324

(51) Int. Cl.
*G06F 3/041* (2006.01)
*G06F 3/0488* (2013.01)

(52) U.S. Cl.
CPC .......... *G06F 3/0414* (2013.01); *G06F 3/0416* (2013.01); *G06F 3/0488* (2013.01)

(58) Field of Classification Search
CPC ..... G06F 3/0414; G06F 3/0488; G06F 3/0416
See application file for complete search history.

(56) References Cited

U.S. PATENT DOCUMENTS

| | | | |
|---|---|---|---|
| 9,880,735 B2 * | 1/2018 | Dascola | H04M 1/72522 |
| 10,042,542 B2 * | 8/2018 | Bernstein | G06F 3/0488 |
| 2011/0057903 A1 | 3/2011 | Yamano et al. | |
| 2012/0026110 A1 * | 2/2012 | Yamano | G06F 3/0418 345/173 |
| 2013/0311922 A1 * | 11/2013 | Park | G06F 3/0481 715/769 |
| 2015/0212571 A1 | 7/2015 | Kitada | |
| 2016/0062542 A1 * | 3/2016 | Kim | G06F 3/0416 345/174 |
| 2016/0231922 A1 * | 8/2016 | Ueno | G06F 3/0346 |

(Continued)

FOREIGN PATENT DOCUMENTS

| | | |
|---|---|---|
| AU | 2016100653 A4 | 5/2016 |
| JP | 2011-59821 A | 3/2011 |
| JP | 2015-201781 A | 11/2015 |

(Continued)

OTHER PUBLICATIONS

European Search Report dated Jan. 9, 2018, 8 pages.

(Continued)

*Primary Examiner* — Kwang-Su Yang
(74) *Attorney, Agent, or Firm* — The Belles Group, P.C.

(57) ABSTRACT

The present invention relates to a force touch method of a touch input device and more particularly to a method for providing different functions in accordance with the force touch input to the touch input device. The force touch method of the touch input device including a touch input unit and a controller. The controller detects a magnitude of a pressure of an object, which is input to the touch input unit. The controller controls such that a predetermined 3D touch function is performed in the touch input device. The controller controls such that the N-th 3D touch function is different from the first 3D touch function is performed in the touch input device.

11 Claims, 13 Drawing Sheets

(56) References Cited

U.S. PATENT DOCUMENTS

2016/0357390 A1    12/2016  Federighi et al.
2017/0322658 A1*   11/2017  Lee ...................... G06F 3/0412

FOREIGN PATENT DOCUMENTS

| KR | 10-2012-0003682 A | 1/2012 |
| KR | 10-2014-0016495 A | 2/2014 |
| WO | 2014/073440 A1 | 5/2014 |

OTHER PUBLICATIONS

Korean Search Report dated May 12, 2017, 4 pages.
Japanese Office Action dated May 22, 2018, 3 pages.
Korean Search Report dated Jan. 9, 2018, 8 pages.

* cited by examiner

RELATED ART

RELATED ART

RELATED ART

RELATED ART

FORCE TOUCH METHOD IN TOUCH INPUT DEVICE BASED ON A REFERENCE PRESSURE

CLAIM FOR PRIORITY

This application claims priority to Korean Patent Application No. 10-2016-0102324 filed on Aug. 11, 2016 in the Korean Intellectual Property Office, the entire contents of which are hereby incorporated by reference.

BACKGROUND

Field

The present disclosure relates to a force touch method of a touch input device and more particularly to a method for providing different functions in accordance with the force touch input to the touch input device.

Description of the Related Art

Various kinds of input devices for operating a computing system, such as a button, key, joystick, touch screen, etc., are being developed and used. The touch screen has a variety of advantages, e.g., ease of operation, miniaturization of products and simplification of the manufacturing process, so that the most attention is paid to the touch screen.

A touch surface of a touch input device including a touch sensor panel may be composed of the touch screen. The touch sensor panel is attached to the front side of the touch screen thereby covering the touch screen. A user is able to operate the device by touching the touch screen with his/her finger. The device detects whether or not the touch of the user occurs and the position of the touch, performs operations, and performs operations corresponding to the user's operation.

Most of the devices which adopt the touch screen (e.g., a mobile terminal, PDA, etc.) determine whether or not the user touches and the touch position, and then perform a specific operation. Specifically, when the user touches an area displaying an application, the device detects the position where the touch occurs, and then executes, drives, or terminates the application. Each device drives the application on the basis of a touch time period, the number of the touches or a touch pattern. For example, a displayed object can be operated in various methods by a long touch, a double touch, a multi touch, etc.

However, the above-mentioned conventional touch control method performs specific operations on the basis of the touch position, touch pattern and touch time period, the controllable operations are limited. At the current point of time when the functions of various devices are integrated and become more and more diversified, there is a demand for a new touch method departing from the conventional touch control method.

The new touch method includes a force touch (so called "3D touch"). Recently, a smartphone or computer to which such a force touch has been applied is being released.

In various force touch methods applied to the smartphone being released, there is a peek and pop function. The peek and pop function will be described with reference to FIGS. 1 to 4.

FIGS. 1 to 3 show an actual example of the peek and pop function applied to a conventional smartphone. FIG. 4 is a force-pressure (prs) graph for describing the peek and pop function applied to the conventional smartphone shown in FIGS. 1 to 3.

Referring to FIGS. 1 to 4, when a user touches a first area "A" of a display shown in FIG. 1 with his/her finger and the magnitude of a force applied by the user is greater than 300 (gf), a new window "W" smaller than the display is generated as shown in FIG. 2 (so called, peek function).

In the state where the peek function is performed, when the magnitude of a force applied by the user is greater than 600 (gf), the new window "W" shown in FIG. 2 is, as shown in FIG. 3, displayed on the entire display (so called, pop function).

As such, according to the peek and pop function applied to the conventional smartphone, in a state where two different reference pressures (0.30 prs and 0.60 prs) are set in advance, when the magnitude of the pressure corresponding to the magnitude of the force applied by the user exceeds a first reference pressure (0.30 prs), a first force touch function (first 3D touch function) such as the peek function shown in FIG. 2 is performed, and when the magnitude of the pressure exceeds a second reference pressure (0.60 prs), a second force touch function (second 3D touch function) such as the pop function shown in FIG. 3 is performed.

The conventional peek and pop function described in FIGS. 1 to 4 has the following problems. This will be described with reference to FIGS. 5 and 6.

FIGS. 5 and 6 are graphs for describing the problems of the conventional peek and pop function.

When a material such as cushion for detecting the force touch is present within the smartphone to which the conventional peek and pop function has been applied, the force-pressure (prs) graph is not shown in the form of a linear straight line as shown in FIGS. 5 and 6. Particularly, the variation of the force-pressure (prs) value is very large according to a location on the display.

Also, for the purpose of mapping a predetermined pressure (prs) value in response to a predetermined force, calibration should be performed during the manufacturing process thereof. For the sake of correctly mapping two forces corresponding to the two reference pressures respectively, calibration should be performed for each of the two forces. During the performance of the calibration, since the calibration must be performed twice for 15 or more points of the surface of a cover covering the display, there are many problems in a time period required for performing the calibration.

SUMMARY

One embodiment is a force touch method of a touch input device including a touch input unit and a controller. The method includes: a detecting step in which the controller detects a magnitude of a pressure of an object, which is input to the touch input unit; a first 3D touch function control step in which when the detected magnitude of the pressure increases from below a magnitude of a predetermined reference pressure to above the magnitude of the reference pressure, the controller controls such that the first predetermined 3D touch function is performed in the touch input device; and an N-th 3D touch function control step in which, while the object is not released from the touch input unit, when the number for which the detected magnitude of the pressure increases from below the magnitude of the reference pressure to above the magnitude of the reference pressure is N (here, N is a natural number greater than 1), the controller controls such that the N-th 3D touch function different from the first 3D touch function is performed in the touch input device.

In the N-th 3D touch function control step, between a first time point "Ta" when the detected magnitude of the pressure increases from below the magnitude of the reference pressure to above the magnitude of the reference pressure and a second time point "Tc" when the magnitude of the pressure, which is detected after the first time point, increases from below the magnitude of the reference pressure to above the magnitude of the reference pressure, the controller may control such that the first 3D touch function is maintained as it is.

In the N-th 3D touch function control step, when the number for which the detected magnitude of the pressure reduces to below the magnitude of an auxiliary reference force is at least one between a first time point "Ta" when the detected magnitude of the pressure increases from below the magnitude of the reference pressure to above the magnitude of the reference pressure and a second time point "Tc" when the magnitude of the pressure, which is detected after the first time point, increases from below the magnitude of the reference pressure to above the magnitude of the reference pressure, the controller may control such that the 3D touch function set to be performed at the second time point is performed in the touch input device.

The auxiliary reference force may have a magnitude less than that of the reference pressure.

A magnitude the auxiliary reference force may be the same as that of the reference pressure.

When the magnitude of the pressure, which is detected between the first time point "Ta" and the second time point "Tc", does not reduce to below the magnitude of the auxiliary reference force, the 3D touch function set to be performed at the first time point "Ta" may be also maintained at the second time point.

The first 3D touch function may be a function in which the controller displays predetermined information on a portion of a display of the touch input unit, and the N-th 3D touch function may be a function in which the controller displays the predetermined information on the entire display of the touch input unit.

The first 3D touch function may be a function in which the controller maintains the turned-off display of the touch input unit as it is, and the N-th 3D touch function may be a function in which the controller entirely or partially turns on the turned-off display of the touch input unit.

In the N-th 3D touch function, the controller may control such that a predetermined application is executed on the turned-on portion of the display of the touch input unit.

The first 3D touch function may be a function in which the controller maintains a lock screen displayed on a display of the touch input unit, and the N-th 3D touch function may be a function in which the controller executes a predetermined application on the display of the touch input unit.

DETAILED DESCRIPTION

Figure 1:
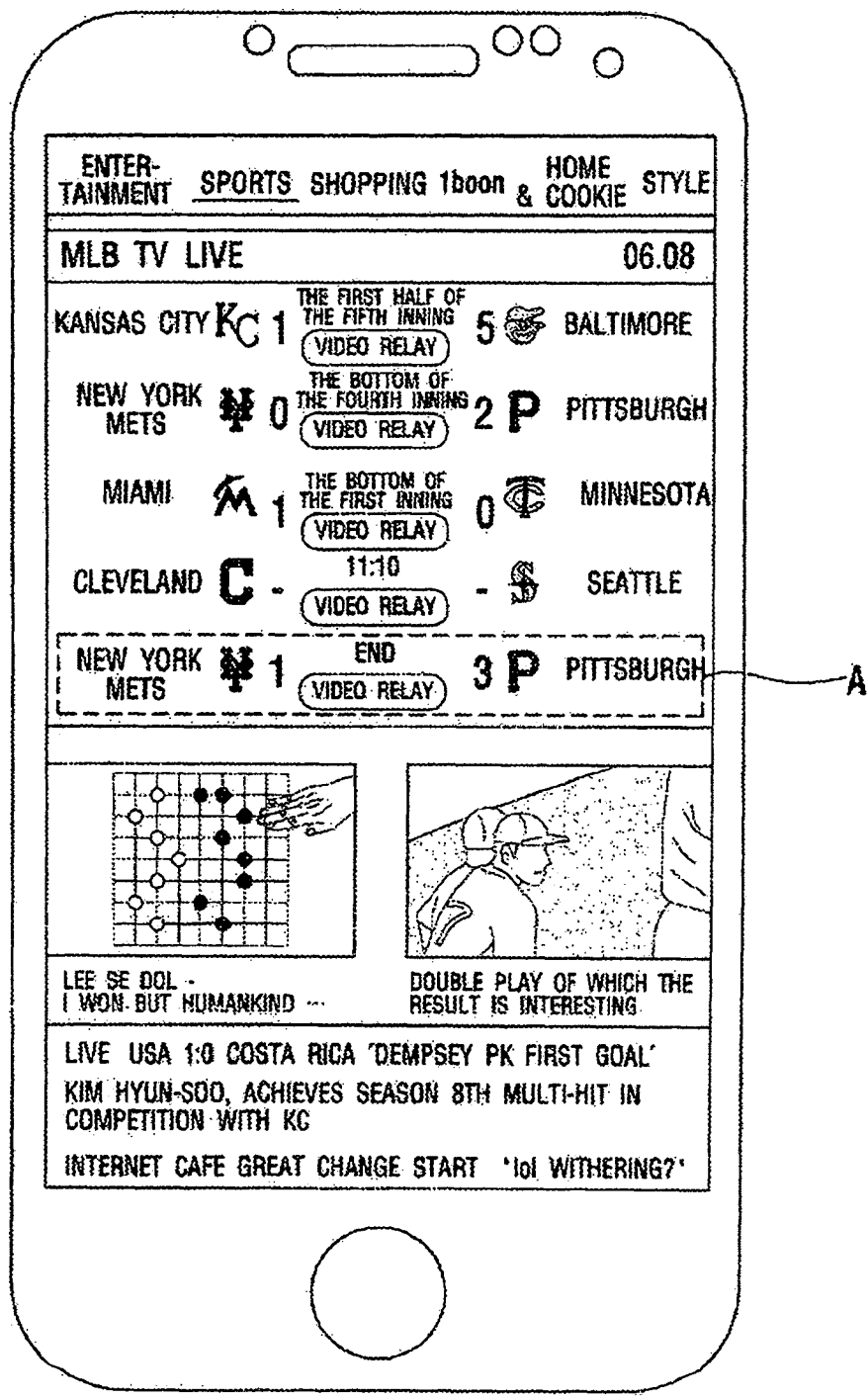
FIG. 1, FIG. 2, and FIG. 3 show an actual example of a peek and pop function applied to a conventional smartphone.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Terms used in variously described embodiments of the present specification are provided for only the description of specific embodiments, and not intended to be limiting. As used in the description of the variously described embodiments and the appended claims, singular forms ("a", "an", and "the") are intended to include plural forms as well, unless expressly described otherwise. It will be understood that the term of "and/or" used in the present specification represents and includes any and all possible combinations of one or more of related items mentioned. While the terms "include", "including", "comprise" used in the present specification specify the existences of characteristics, essentials, steps, operations, elements, and/or components stated, it will be further understood that the existences or additions of one or more other characteristics, essentials, steps, operations, elements, components and/or groups thereof are not excluded.

In the following description, a touch input device including a touch screen will be described. However, it should be understood that the touch input device includes selectively one or more other physical user interface devices such as a physical keyboard, mouse and/or joystick.

The touch input device typically supports various applications such as at least one of a drawing application, a presentation application, a word processing application, a web-site creation application, a disc authoring application, a spreadsheet application, a game application, a phone application, a video conferencing application, an email application, an instant messaging application, an exercise support application, a picture management application, a digital camera application, a digital video camera application, a web browsing application, a digital music player application, and/or a digital video player application.

Figure 7:
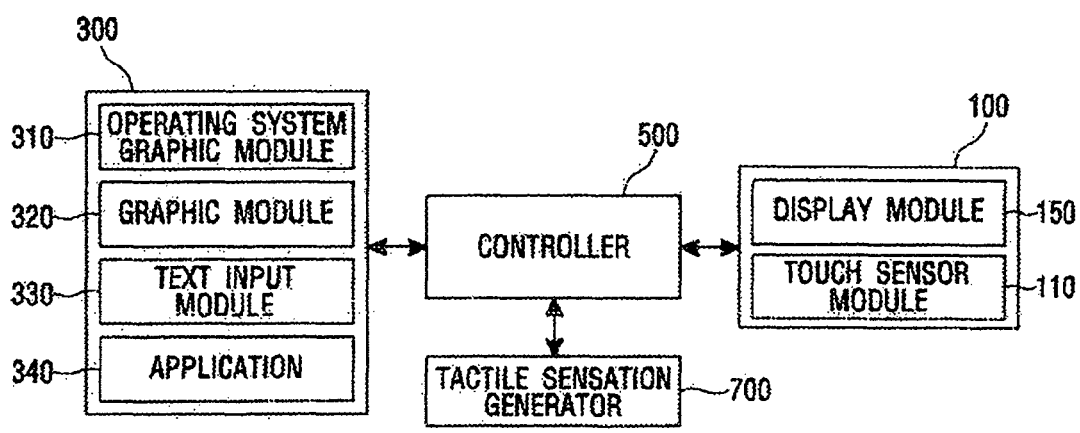
FIG. 7 is a block diagram showing a touch input device according to an embodiment of the present invention.

FIG. 7 is a block diagram showing the touch input device according to an embodiment of the present invention.

Referring to FIG. 7, the touch input device according to the embodiment of the present invention may include a touch input unit 100, a memory 300, a controller 500, and a tactile sensation generator 700.

The touch input unit 100 includes a touch sensor module 110 and a display module 150.

The touch input unit 100 functions as a display means. For this, the touch input unit 100 includes the display module 150. The display module 150 displays visual outputs to a user. The visual output includes selectively a graphic, text, icons, video, and any combination of them (collectively referred to as "graphics").

The touch input unit 100 functions as an input means. For this, the touch input unit 100 includes the touch sensor module 110. Here, the function as an input means detects touch information which is input to the touch input unit 100.

The touch information includes 2D touch information and 3D touch information. That is, the touch information includes 2D touch information on whether or not the touch is input (whether or not the touch occurs), and on which position in the surface of the touch input unit 100 the touch is input to (the touch position). Moreover, the touch information may further include information on whether or not the touch is the 2D touch and on whether or not the touch is the 3D touch with a pressure having a magnitude greater than a predetermined magnitude. Here, 3D touch information may mean a touch having a sufficient pressure for the surface of the touch input unit 100 to be bent.

The touch input unit 100 may be designated as a so-called "touch and pressure sensitive touch screen".

The term "strength" of the touch on the surface of the touch input unit 100 refers to a force or pressure (force per unit area) of the touch (e.g., finger touch) on the surface of the touch input unit 100. The strength of the touch includes at least four different values, and more typically has a variety of values including several hundred different values (e.g., at least 256 values). The strength of the touch is determined (or measured) by selectively using various approaches and various sensors or a combination of the sensors. For example, one or more pressure sensors which are adjacent to or under the surface of the touch input unit 100 are selectively used, thereby measuring the force at various points on the surface of the touch input unit 100. The size of the touch area and/or the change of the touch area, which has been detected on the surface of the touch input unit 100, a capacitance of a touch-sensitive surface and/or the change of the touch-sensitive surface in the vicinity of the touch, and/or a surface resistance and/or the change of the surface resistance in the vicinity of the touch are selectively used as a substitute for the force or pressure of the touch on the surface of the touch input unit 100.

The touch sensor module 110 of the touch input unit 100 may be disposed on or under the display module 150. Also, the touch sensor module 110 may be embedded in the display module 150. The detailed embodiments of the touch input unit 100 will be described below with reference to the accompanying drawings.

The touch input unit 100 uses a liquid crystal display (LCD) technology, a luminescent polymer display (LDP) technology, or a light emitting diode (LED) technology. Also, other display technologies may be used in other embodiments.

The touch input unit 100 and the controller 500 (together with any related modules and/or sets of instructions within the memory 300) detect the touch (and any movement or stopping of the touch) on the touch input unit 100, and converts the detected touch into user interface objects (e.g., one or more soft keys, icons, web pages or images) displayed by the display module 150 of the touch input unit 100.

In order to selectively determine one or more touch points with the touch input unit 100, the touch input unit 100 and the controller 500 include proximity sensor arrays or other components which are different from the capacitance, resistance, infrared rays, and surface acoustic wave technologies. However, the touch input unit 100 and the controller 500 detect the touch and any movement or stopping of the touch by using any one among a plurality of touch sensing technologies which are not limited to the above arrays or components and are currently known or to be developed in the future.

The touch input unit 100 selectively has a video resolution exceeding 100 dpi. In some embodiments, the touch input unit 100 has a video resolution of about 160 dpi. The user touches the touch input unit 100 by selectively using any suitable object such as a stylus, a finger, etc., or accessories. In some embodiments, a user interface is designed to work by mainly using finger-based touch and gestures. This may be less precise than the stylus-based input due to the wider touch area of the finger on the touch input unit 100. In some embodiments, the touch input device converts a rough finger-based input into a precise pointer/cursor position or command for performing actions that the user wants.

Hereinafter, the structure of the touch input unit 100 will be described with reference to FIGS. 8 to 21.

Figure 8:
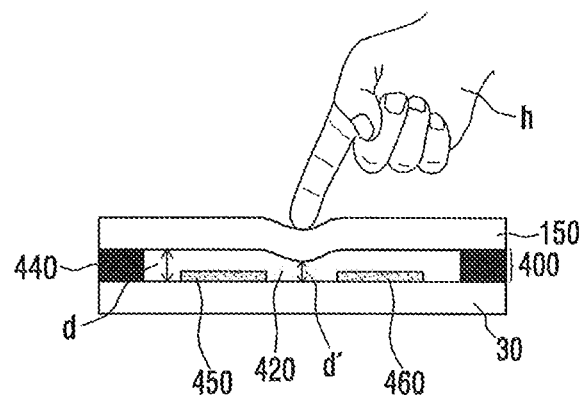
FIG. 8 is a cross sectional view of a first embodiment of a touch input unit 100 shown in FIG. 1.

FIG. 8 is a cross sectional view of a first embodiment of a touch input unit 100 shown in FIG. 7.

Figure 2:
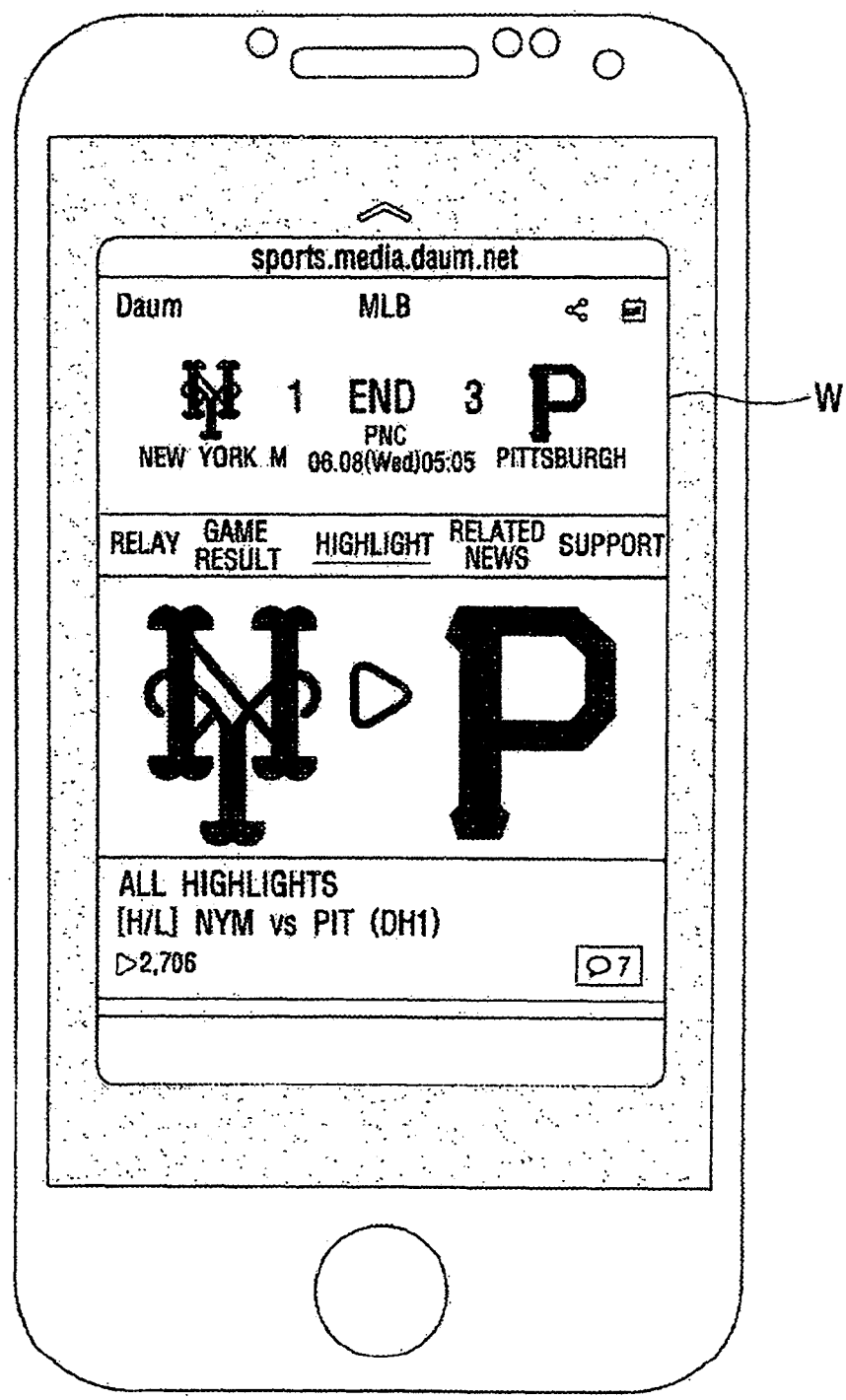

As shown in FIG. 2, pressure electrodes 450 and 460 according to the first embodiment of the present invention may be formed within a spacer layer 420 and on a substrate 30.

The pressure electrodes 450 and 460 for pressure detection may include the first electrode 450 and the second electrode 460. Any one of the first and the second electrodes 450 and 460 may be a drive electrode and the other may be a receiving electrode. A driving signal is applied to the drive electrode, and a sensing signal may be obtained through the receiving electrode. When a voltage is applied, a mutual capacitance may be generated between the first electrode 450 and the second electrode 460.

The bottom surface of the display module 150 may have a ground potential for blocking noise. When pressure is applied to the surface of the touch sensor module 110 of FIG.

7 by an object "h", the touch sensor module 110 and the display module 150 may be bent. Accordingly, a distance "d" between the ground potential surface and the pressure electrodes 450 and 460 may be reduced to a distance "d'". In this case, due to the reduction of the distance "d'", fringing capacitance is absorbed in the bottom surface of the display module 150, so that the mutual capacitance between the first electrode 450 and the second electrode 460 may be reduced. Therefore, the magnitude of the touch pressure can be calculated by obtaining the reduction amount of the mutual capacitance from the sensing signal obtained through the receiving electrode.

The display module 150 may be bent by the touch applying the pressure. The display module 150 may be bent in such a manner as to show the biggest transformation at the touch position. When the display module 150 is bent according to the embodiment, a position showing the biggest transformation may not match the touch position. However, the display module 150 may be shown to be bent at least at the touch position. For example, when the touch position approaches close to the border, edge, etc., of the display module 150, the most bent position of the display module 150 may not match the touch position, however, the display module 150 may be shown to be bent at least at the touch position.

The top surface of the substrate 30 may also have the ground potential for blocking noise. Accordingly, the pressure electrodes 450 and 460 may be formed on an insulation layer (not shown) in order that the substrate 30 and the pressure electrodes 450 and 460 are prevented from being short-circuited. According to the embodiment, the insulation layer (not shown) on which the pressure electrodes 450 and 460 have been formed is attached to the substrate 30. Also, the pressure electrodes 450 and 460 according to the embodiment may be formed by positioning a mask, which has a through-hole corresponding to a pressure electrode pattern, on the substrate 30 or on the insulation layer (not shown) on the substrate 30, and then by spraying a conductive material.

When the bottom surface of the display module 150 has the ground potential, the insulation layer (not shown) may be disposed on the pressure electrodes 450 and 460 in order to prevent the display module 150 and the pressure electrodes 450 and 460 which are located on the substrate 30 are prevented from being short-circuited.

The insulation layer may be disposed on and under the pressure electrodes 450 and 460 such that the pressure electrodes 450 and 460 are positioned between the insulation layers respectively. The two insulation layers and the pressure electrodes 450 and 460 may form one pressure sheet.

Depending on the type and/or implementation method of the touch input unit 100 of FIG. 7, the substrate 30 or the display module 150 to which the pressure electrodes 450 and 460 are attached may not have the ground potential or may have a weak ground potential. In this case, the touch input unit 100 shown in FIG. 7 may further include a ground electrode (not shown) between the insulation layer (not shown) and the substrate 30 or between the insulation layer (not shown) and the display module 150. According to the embodiment, another insulation layer (not shown) may be included between the ground electrode and the substrate 300 or between the ground electrode and the display module 150. Here, the ground electrode (not shown) is able to prevent the size of the capacitance generated between the first electrode 450 and the second electrode 460, which are pressure electrodes, from increasing excessively.

An adhesive tape 440 with a predetermined thickness may be formed along the border of the upper portion of the substrate 30 in order to maintain the spacer layer 420. The adhesive tape 440 may be a double adhesive tape. The adhesive tape 440 may be made of an inelastic material. In the embodiment of the present invention, when a pressure is applied to the display module 150, the display module 150 may be bent. Therefore, the magnitude of the touch pressure can be detected even though the adhesive tape 440 is not transformed by the pressure.

Meanwhile, though not shown in a separate drawing, the pressure electrodes 450 and 460 may be disposed on the bottom surface of the display module 150. Here, substrate 30 may have the ground potential. Therefore, the distance "d" between the substrate 30 and the pressure electrodes 450 and 460 is reduced by touching the touch surface of the touch input unit 100 of FIG. 7. Consequently, this may cause the change of the mutual capacitance between the first electrode 450 and the second electrode 460. Through this, the magnitude of the touch pressure can be calculated. Also, the self-capacitance of the pressure electrodes 450 and 460 is changed due to the change of the distance between the pressure electrodes 450 and 460 and the substrate 30 as a reference potential layer. Through obtaining information on such a change of the capacitance, the magnitude of the touch pressure can be calculated.

Meanwhile, though not shown in a separate drawing, any one of the first electrode 450 and the second electrode 460 may be formed on the substrate 30, and the other may be formed under the display module 150. A distance between the first electrode 450 and the second electrode 460 is reduced by the force caused by the object "h". Due to the reduction of the distance, the mutual capacitance between the first electrode 450 and the second electrode 460 is changed. The reduction amount of the mutual capacitance is obtained by the sensing signal obtained by the receiving electrode of any one of the first electrode 450 and the second electrode 460, so that the magnitude of the touch pressure can be calculated.

Figure 9:
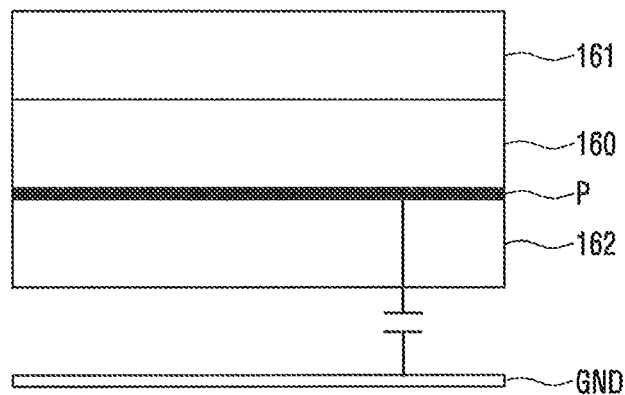
FIG. 9 is a cross sectional view of a second embodiment of the touch input unit 100 shown in FIG. 1.

FIG. 9 is a cross sectional view of a second embodiment of the touch input unit 100 shown in FIG. 7.

The touch input unit 100 shown in FIG. 9 has a structure in which a pressure electrode "P" is disposed within the display module 150 shown in FIG. 7.

As shown in FIG. 9, OLED display modules 160, 161, and 162 include an organic material layer 160 between the first substrate layer 161 and the second substrate layer 162. The pressure electrode "P" for detecting the touch pressure in the self-capacitance type may be formed on the top surface of the second substrate layer 162. The pressure electrode "P" may use a light shield (LS) for blocking light inflow, a gate electrode, a source electrode, a drain electrode, a pixel electrode, etc. In some cases, a separate metallic material is deposited on the pressure electrode "P", and the pressure electrode "P" can be also used in the pressure detection. Furthermore, a separate structure made of a metallic material is provided to the pressure electrode "P", and the pressure electrode "P" can be also used in the pressure detection.

Meanwhile, though not shown in a separate drawing, the pressure electrode "P" may be formed on the top surface or bottom surface of the first substrate layer 161 or may be formed on the bottom surface of the second substrate layer 162.

The reference potential layer (GND) shown in FIG. 9 may be substituted by the pressure electrode for pressure detection. For convenience of description, the pressure electrode "P" shown in FIG. 9 is referred to as a first pressure electrode, and the pressure electrode substituted for the reference potential layer (GND) is referred to as a second pressure electrode. The mutual capacitance change amount based on the change of the distance between the first pressure electrode "P" and the second pressure electrode is received through any one of the first pressure electrode "P" and the second pressure electrode, so that the touch pressure can be detected.

Meanwhile, though not shown in a separate drawing, the touch input unit 100 shown in FIG. 7 is also able to detect the touch pressure without a separate pressure electrode by using the drive electrode for driving the display module 150 or a touch electrode for detecting the touch position of the touch sensor module 110.

For example, the first pressure electrode "P" of FIG. 9 may be the touch electrode of the touch input unit 100 of FIG. 7. The touch position which is input to the touch input unit 100 can be detected through the touch electrode "P". The touch pressure can be also detected by detecting the change of the mutual capacitance or self-capacitance based on the distance change between the touch electrode "P" and the reference potential layer (GND). Here, in order to detect the touch position and touch pressure by means of one touch pressure "P", two or more driving signals (driving signal for detecting the touch position/driving signal for detecting the touch pressure) which are input to one touch electrode "P" may be distinguished from each other and applied at different times.

Figure 10:
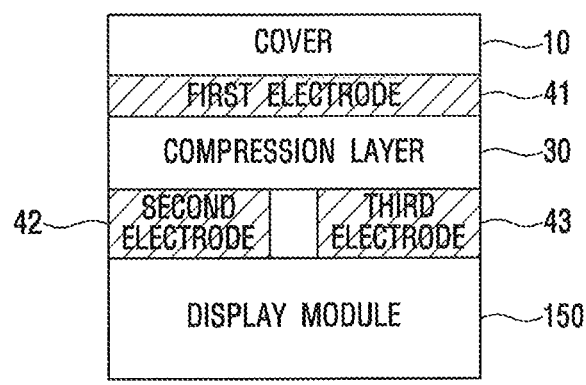
FIG. 10 is a cross sectional view of a third embodiment of the touch input unit 100 shown in FIG. 7.

FIG. 10 is a cross sectional view of a third embodiment of the touch input unit 100 shown in FIG. 7.

Referring to FIG. 10, the touch input unit 100 according to the third embodiment may include a cover 10, a first electrode 41 disposed under the cover 10, a compression layer 30 disposed under the first electrode 41, a second electrode 42 and a third electrode 43 which are disposed under the compression layer 30, and the display module 150 disposed under the second electrode 42 and the third electrode 43.

The cover 10 is a member to which the touch is input by an input means such as a user's finger or object. The cover 10 may be located on the top of the touch input unit 100. The cover 10 functions to protect the components disposed thereunder.

The cover 10 may be made of a transparent material such as glass or plastic such that an image output from the display module 150 disposed under the cover 10 is visible to the outside.

The cover 10 may be made of a flexible material which can be bent at least at a position where the pressure is applied, such that the compression layer 30 to be described later is compressed when a pressure is applied to the cover 10.

The first electrode 41 may be disposed under the cover 10, and the second electrode 42 may be disposed under the first electrode 41. The third electrode 43 may be disposed, together with the second electrode 42, in the same layer.

Figure 11:
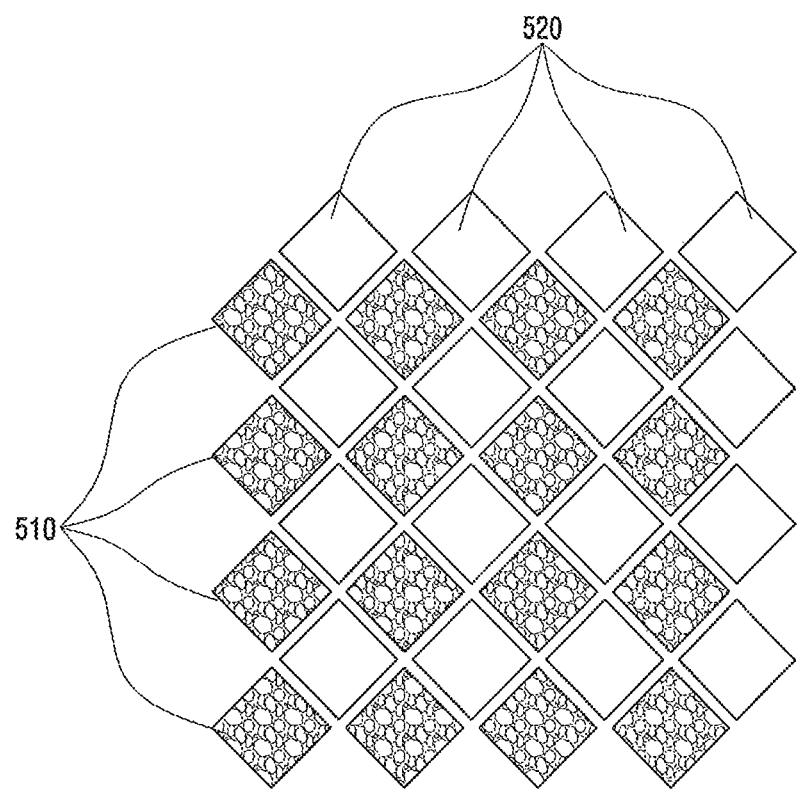
FIG. 11, FIG. 12, and FIG. 13 show modified examples of a first electrode 41 and a second electrode 42.

As shown in FIG. 11, the second electrode 42 and the third electrode 43 may be comprised of a plurality of lozenge-shaped electrodes. Here, the second electrode 42 is a plurality of first axis electrodes 510 which are connected to each other in a first axial direction, and the third electrode 43 is a plurality of second axis electrodes 520 which are connected to each other in a second axial direction orthogonal to the first axial direction. In at least one of the second electrode 42 and the third electrode 43, the plurality of the lozenge-shaped electrodes are connected respectively through a bridge, so that the second electrode 42 and the third electrode 43 may be insulated from each other.

Figure 12:
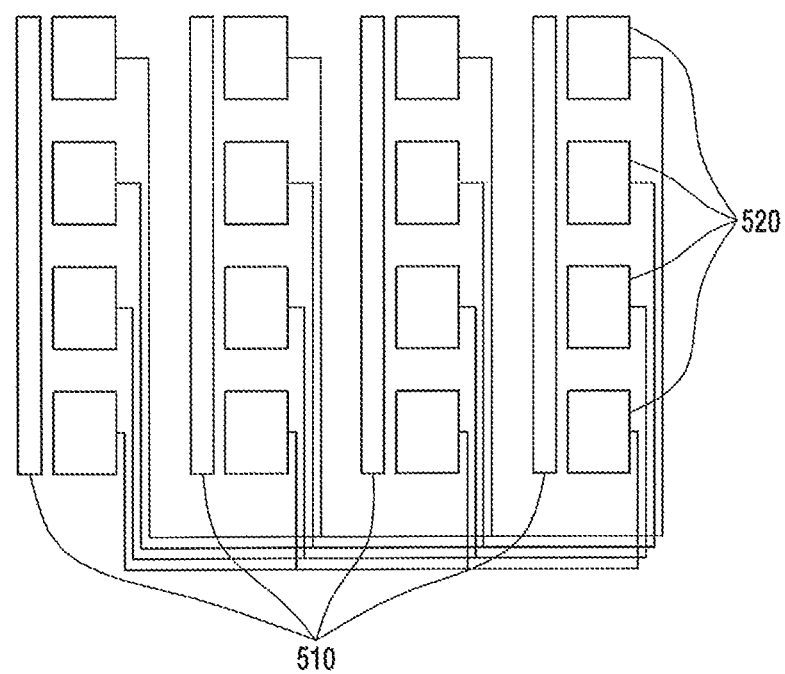

As shown in FIG. 12, the second electrode 42 and the third electrode 43 are comprised of the plurality of the first axis electrodes 510 and the plurality of the second axis electrodes 520. Therefore, the second electrode 42 and the third electrode 43 may be arranged without crossing each other such that the third electrodes 43 are connected respectively in a direction crossing the extension direction of the second electrode 42.

Figure 13:
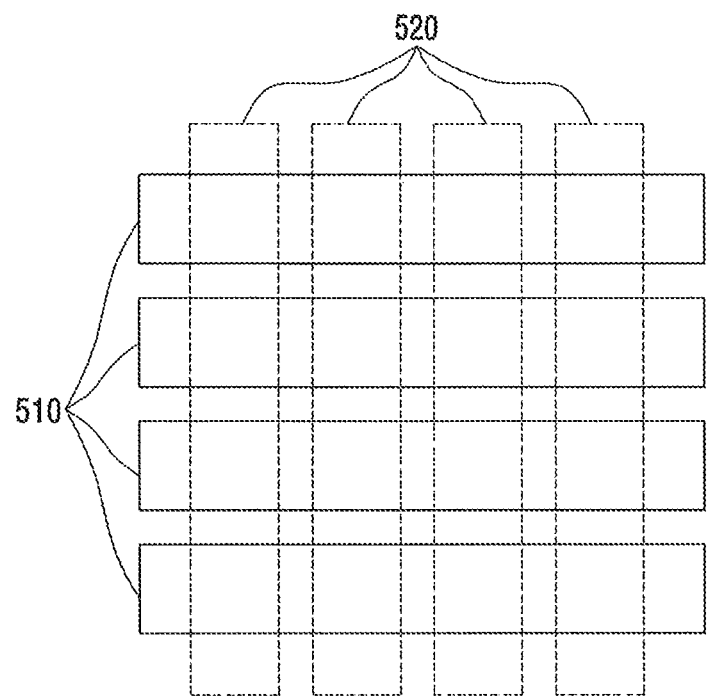

Since the first electrode 41 and the second electrode 42, or the first electrode 41 and the third electrode 43 are located in different layers, they can be implemented so as to overlap each other. For example, the first electrode 41 and the second electrode 42, or the first electrode 41 and the third electrode 43 may be, as shown in FIG. 13, comprised of the plurality of the first axis electrodes 510 and the plurality of the second axis electrodes 520 respectively, and may be arranged to cross each other. Alternatively, as shown in FIG. 11, the first lozenge-shaped axis electrode 510 and the second lozenge-shaped axis electrode 520 may be located in different layers.

The first electrode 41 may be directly formed on the bottom surface of the cover 10. Likewise, the second electrode 42 and the third electrode 43 may be directly formed on the top surface of the display module 150. Specifically, the second electrode 42 and the third electrode 43 may be directly formed on the top surface of below-described first substrate layers 151 and 161 of the display module 150. Here, the first electrode 41, the second electrode 42, and the third electrode 43 may be made of a transparent conductive material (e.g., Indium Tin Oxide (ITO) or Antimony Tin Oxide (ATO)), etc. Also, an insulation film (not shown) made of a plastic-made thin transparent film such as Polyethylene terephthalate (PET) may be disposed between the cover 10 and the first electrode 41, between the first electrode 41 and the compression layer 30, between the compression layer 30, the second electrode 42, and the third electrode 43, or between the second electrode 42, the third electrode 43, and the display module 150. Here, the insulation film protects the electrodes disposed under the cover 10 even though the cover 10 is damaged by external impact, thereby functioning to maintain the touch input operation. Here, an optical clear adhesive (OCA, not shown) is located between the insulation film and the electrode or between the electrode and the compression layer 30, so that they can be adhered to each other.

The compression layer 30 is made of a material which is pressed when a pressure is applied to the cover 10, and restores its original state when the applied pressure is released. The faster the restoring force is, the higher the pressure detection accuracy can be. The compression layer 30 may be made of silicone, acryl, or other compressible elastic bodies. The compression layer 30 may be made of a transparent material such that an image output from the display module 150 is visible to the outside because the compression layer 30 is disposed on the display module 150.

Though not shown in the drawing, the position of the first electrode 41 may be changed into the positions of the second electrode 42 and the third electrode 43, and the positions of the second electrode 42 and the third electrode 43 may be changed into the position of the first electrode 41.

The display module 150 includes any one of a liquid crystal display (LCD) panel, a plasma display panel (PDP), and an organic light emitting diode (OLED) panel. Accordingly, the user is able to perform the input operation by touching the surface of the touch input unit 100 while visually checking the screen of the display module 150.

Here, the display module 150 may include a control circuit which receives an input from an application processor (AP) or a central processing unit (CPU) on a main board for the operation of the touch input device and displays the contents that the user wants on the screen of the display module 150. The control circuit may be mounted on a second printed circuit board (hereafter, referred to as a second PCB). Here, the control circuit for the operation of the display module 150 may include a display panel control IC, a graphic controller IC, and a circuit required to operate other display panels.

Figure 14:
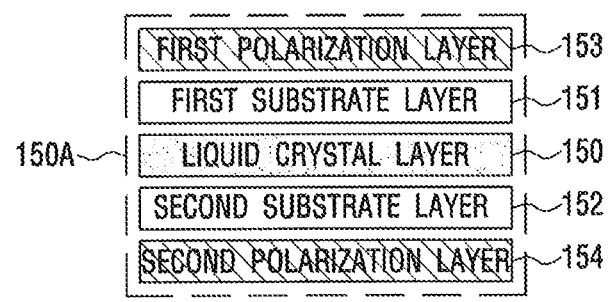
FIG. 14 shows a display module 150A including an LCD panel.
Figure 15:
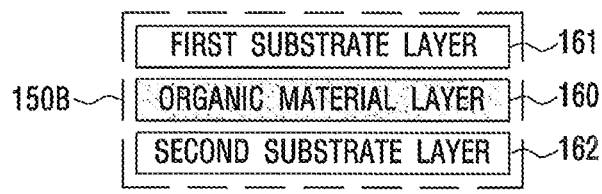
FIG. 15 shows a display module 150B including an OLED panel.

FIG. 14 shows a display module 150A including an LCD panel, and FIG. 15 shows a display module 150B including an OLED panel.

As shown in FIG. 14, the display module 150A may include a liquid crystal layer 150 including a liquid crystal cell, the first substrate layer 151 and a second substrate layer 152 which are disposed on both sides of the liquid crystal layer 150 and include electrodes, a first polarization layer 153 formed on a side of the first substrate layer 151 in a direction facing the liquid crystal layer 150, and a second polarization layer 154 formed on a side of the second substrate layer 152 in the direction facing the liquid crystal layer 150. It is clear to those skilled in the art that the LCD panel may further include other structures for the purpose of performing the displaying function and may be transformed. Here, the first substrate layer 151 may be color filter glass, and the second substrate layer 152 may be TFT glass.

Here, the display module 150A including the LCD panel may include a backlight unit (not shown) disposed under the second polarization layer 154. The display module 150A, which is the LCD panel, itself cannot emit light and functions to block or transmits the light. Therefore, a light source is disposed under the display module 150A and throws light on the display module 150A, so that the screen displays information with various colors as well as brightness and darkness. A light source having a uniform luminance distribution is required on the rear side because the display module 150A, which is the LCD panel, is a passive device and itself cannot emit the light.

As shown in FIG. 15, the display module 150B may include the organic material layer 160, the first substrate layer 161 and the second substrate layer 162 both of which are located on both sides of the organic material layer 160. It is clear to those skilled in the art that the OLED panel may further include other structures for the purpose of performing the displaying function and may be transformed. Here, the first substrate layer 161 may be encapsulation glass, and the second substrate layer 162 may be TFT glass.

Figure 16:
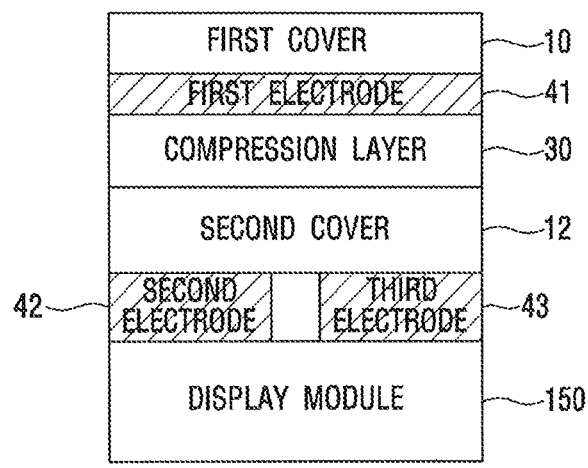
FIG. 16, FIG. 17, and FIG. 18 are cross sectional views for describing a modified example of the touch input unit shown in FIG. 4.
Figure 17:
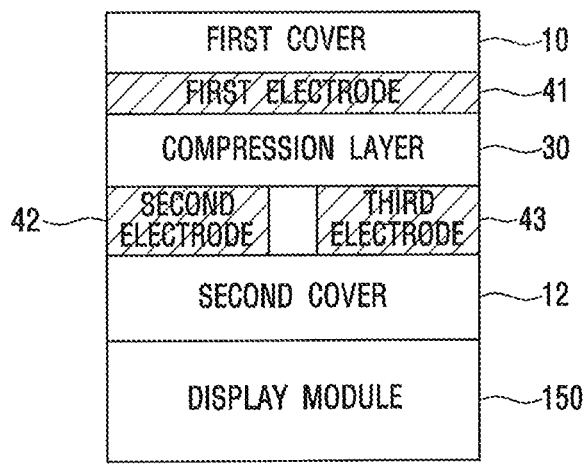
Figure 18:
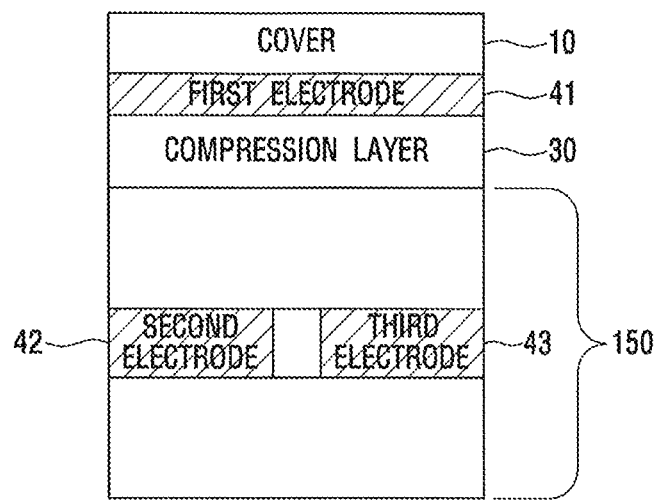

FIGS. 16 to 18 are cross sectional views for describing a modified example of the touch input unit shown in FIG. 10.

As shown in FIG. 16, the touch input unit may further include a second cover 12. Here, the second cover 12 may be made of a transparent material such as glass or plastic such that an image output from the display module 150 disposed under the second cover 12 is visible to the outside. Also, the second cover 12 may be made of a material which is relatively more solid than that of the first cover 10 or may be formed thicker than the first cover 10 such that the second cover 12 is not bent even by a pressure applied to the second cover 12.

The structures of the second cover 12, the second electrode 42, the third electrode 43, and the display module 150 of the touch input unit shown in FIG. 16 is the same as those of a conventional touch input device which does not detect the touch pressure. Accordingly, it is possible to implement the touch input unit capable of detecting the touch pressure by adding a touch pressure detection module composed of the first cover 10, the first electrode 41, and the compression layer 30 to the conventional touch input unit. Therefore, there is no need to change the structure of the conventional touch input unit and reliability can be easily obtained.

As shown in FIG. 17, in the touch input unit according to the embodiment of the present invention, the second electrode 42 and the third electrode 43 are disposed between the compression layer 30 and the second cover 12.

In the touch input unit shown in FIG. 17, a module which is composed of the first cover 10, the first electrode 41, the compression layer 30, the second electrode 42, the third electrode 43, and the second cover 12 and detects the touch position and the touch pressure is completely separated from the display module 150. Therefore, the display module 150 and the module for detecting the touch position and the touch pressure can be replaced separately from each other.

Unlike the touch input unit shown in FIG. 8, in the touch input unit shown in FIG. 18, the second electrode 42 and the third electrode 43 may be disposed within the display module 150. The second electrode 42 and the third electrode 43 may be disposed between the liquid crystal layer 150 and the second substrate layer 152 which are shown in FIG. 14.

Though not shown in the drawings, in the touch input unit shown in FIGS. 16 to 18, the position of the first electrode 41 may be changed into the positions of the second electrode 42 and the third electrode 43, and the positions of the second electrode 42 and the third electrode 43 may be changed into the position of the first electrode 41.

Figure 19:
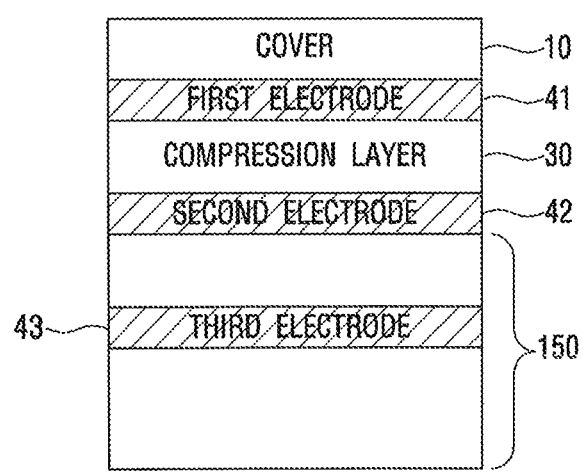
FIG. 19 is a cross sectional view of a touch input unit according to another embodiment of the present invention.

FIG. 19 is a cross sectional view of a touch input unit according to another embodiment of the present invention. The touch input unit shown in FIG. 19 may include the cover 10, the first electrode 41 disposed under the cover 10, the compression layer 30 disposed under the first electrode 41, the second electrode 42 disposed under the compression layer 30, the display module 150 disposed under the second electrode 42, and the third electrode 43 disposed within the display module.

Figure 20:
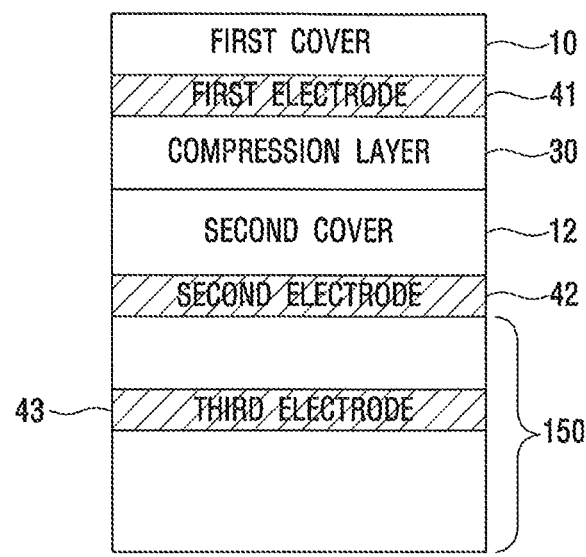
FIG. 20 is a cross sectional view for describing a modified example of the touch input unit shown in FIG. 19 according to the embodiment of the present invention.

FIG. 20 is a cross sectional view for describing a modified example of the touch input unit shown in FIG. 19 according to the embodiment of the present invention.

As shown in FIG. 20, the touch input device may further include the second cover 12. Here, the second cover 12 may be made of a transparent material such as glass or plastic such that an image output from the display module 150 disposed under the second cover 12 is visible to the outside. Also, the second cover 12 may be made of a material which is relatively more solid than that of the first cover 10 or may be formed thicker than the first cover 10 such that the second cover 12 is not bent even by a pressure applied to the second cover 12. Regarding the touch input unit shown in FIG. 17, it is possible to implement the touch input unit capable of detecting the touch pressure by adding a touch pressure detection module composed of the first cover 10, the first electrode 41, and the compression layer 30 to the conventional touch input unit. Therefore, there is no need to change the structure of the conventional touch input unit and reliability can be easily obtained.

Figure 21:
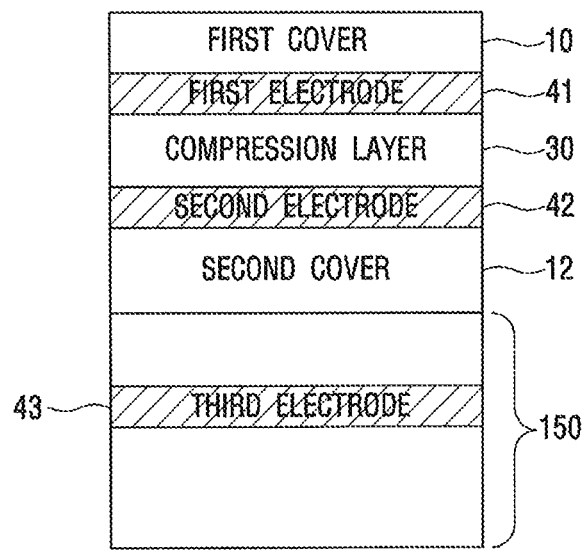
FIG. 21 is a cross sectional view of a touch input unit according to further another embodiment of the present invention.

As shown in FIG. 21, the touch input unit according to the embodiment of the present invention may include the first cover 10, the first electrode 41 disposed under the cover 10, the compression layer 30 disposed under the first electrode 41, the second electrode 42 disposed under the compression layer 30, the second cover 12 disposed under the second electrode 42, the display module 150 disposed under the second cover 12, and the third electrode 43 disposed within the display module 150. In the touch input unit shown in FIG. 18, a module which is composed of the first cover 10, the first electrode 41, the compression layer 30, the second electrode 42, and the second cover 12 and detects the touch position and the touch pressure is completely separated from the display module 150. Therefore, the display module 150 and the module for detecting the touch position and the touch pressure can be replaced separately from each other.

It should be noted that the detailed structure of the touch input unit 100 shown in FIG. 7 is not limited to those shown in FIGS. 8 to 21. It should be understood that the detailed structure of the touch input unit 100 shown in FIG. 7 includes not only those shown in FIGS. 8 to 21 but also any structure capable of detecting the touch pressure.

Referring back to FIG. 7, the memory 300 will be described.

The memory 300 selectively includes a high speed random access memory, and also selectively includes one or more magnetic disk storage devices, flash memory devices, or a non-volatile memory such as other non-volatile solid state memory device.

The memory 300 includes one or more computer-readable components. Specifically, the memory 300 includes an operating system 310, a graphic module 320, a text input module 330, and an application 340.

The operating system 310 may be, for example, an embedded operating system such as Darwin, RTXC, LINUX, UNIX, OS X, WINDOWS, or VxWorks. The operating system 310 includes a variety of software components and/or drivers for controlling and managing general system tasks (e.g., memory management, storage device control, power management, etc.) facilitates communications between various hardware and software components The graphic module 320 includes components for changing visual impacts (e.g., brightness, transparency, saturation, contrast, or other visual attributes) of a graphic to be displayed on the touch input unit 100 and includes a variety of known software components for rendering and displaying the graphic on other displays. As used in this specification, the term "graphic" includes any object which can be displayed to the user and includes texts, web pages, icons (e.g., user interface objects including soft keys), digital images, videos, animations, etc., without limitation.

The text input module 330 provides a soft keyboard for inputting a text to the application 340.

The applications 340 may include not only a browser, an address book, a contact list, email, instant messaging, word processing, keyboard emulation, widget, JAVA-supported applications, encryption, digital right management, voice recognition, voice replication, location determination capability (that is provided by a global positioning system (sometimes referred to as "GPS" in this specification), etc.), a music player, etc., (not limited to these), but also any application which is installed on the memory 300.

Besides, the memory 140 may facilitate communications with other devices through at least one external port and include a communication module including a variety of software components for processing data received by an RF circuit and/or external ports.

The controller 500 detects the position of the touch and the pressure magnitude of the touch which is input to the touch input unit 100. The controller 500 can distinguish the type of the touch in accordance with the detected pressure magnitude of the touch. For example, the controller 500 may determine a touch with a pressure having a magnitude less than the magnitude of a predetermined reference pressure as a light touch and may determine a touch with a pressure having a magnitude greater than the magnitude of a predetermined reference pressure as a force touch.

Also, the controller 500 can detect the time period of the touch which is input to the touch input unit 100.

The controller 500 may include a drive unit which applies a touch position driving signal and a touch pressure driving signal to the touch input unit 100, and a sensing unit which receives a touch position sensing signal and a touch pressure sensing signal. Here, for example, any one of the touch position sensing signal and the touch pressure sensing signal may be based on any one among the capacitance between the first electrode 41 and the second electrode 42 shown in FIGS. 10 to 21, the capacitance between the second electrode 42 and the third electrode 43, and the capacitance between the third electrode 43 and the first electrode 41. The other of the touch position sensing signal and the touch pressure sensing signal may be based on any one of the remaining capacitances other than the above one among the capacitance between the first electrode 41 and the second electrode 42, the capacitance between the second electrode 42 and the third electrode 43, and the capacitance between the third electrode 43 and the first electrode 41. The controller 500 detects the touch position on the basis of the touch position sensing signal and detects the touch pressure on the basis of the touch pressure sensing signal.

On the basis of the detected position information and pressure information of the touch, the controller 500 controls a display function of the display module 150 of the touch input unit 100. How the controller 500 specifically controls the display function of the display module 150 will be described in detail in FIG. 22 and later figures.

The controller 500 controls and manages the touch input unit 100, the memory 300, and tactile sensation generator 700. The controller 500 may request the information from the touch input unit 100, the memory 300, and tactile sensation generator 700 or may cause the touch input unit 100, the memory 300, and tactile sensation generator 700 to change the information.

The tactile sensation generator 700 selectively includes one or more electroacoustic devices such as speakers or other audio components, and/or electromechanical devices which convert energy into a linear motion, such as a motor, solenoid, electroactive polymer, piezoelectric actuator, electrostatic actuator, or other tactile output generating components (e.g., a component converting electrical signals into tactile outputs on the device).

The tactile sensation generator 700 receives tactile feedback generating instructions from the controller 500 and generates tactile outputs which can be sensed by the user who uses the touch input device. In some embodiments, at least one tactile sensation generator 700 is located together with the touch input unit 100 or is adjacent to the touch input unit 100. The tactile sensation generator 700 may selectively move perpendicular to the surface of the display of the touch input unit 100 (e.g., into or out of the surface of the touch input device) or in a lateral direction (e.g., forward and backward within the same plane as the surface of the touch input device), so that the tactile output is generated.

The tactile sensation generator 700 is an additional component and may not be included in the touch input device according to the embodiment of the present invention.

The touch input device according to the embodiment of the present invention is just an example of a portable electronic device such as a smartphone. The touch input device may have a larger or smaller number of components than those shown in FIG. 7 or may selectively have a combination of two or more components, or may selectively have different configurations or arrangements of the components. Various components shown in FIG. 7 can be implemented by hardware, software, or a combination of both hardware and software as well as by one or more signal processing and/or an application specific integrated circuit.

Hereafter, a force touch method of the touch input device according to the embodiment of the present invention will be described in detail with reference to FIGS. 22 to 23.

The force touch method of the touch input device according to the embodiment of the present invention is able to perform at least two different 3D touch functions by using one predetermined reference pressure.

The force touch method of the touch input device according to the embodiment of the present invention includes a series of steps which are performed by the controller 500 shown in FIG. 7.

Figure 22:
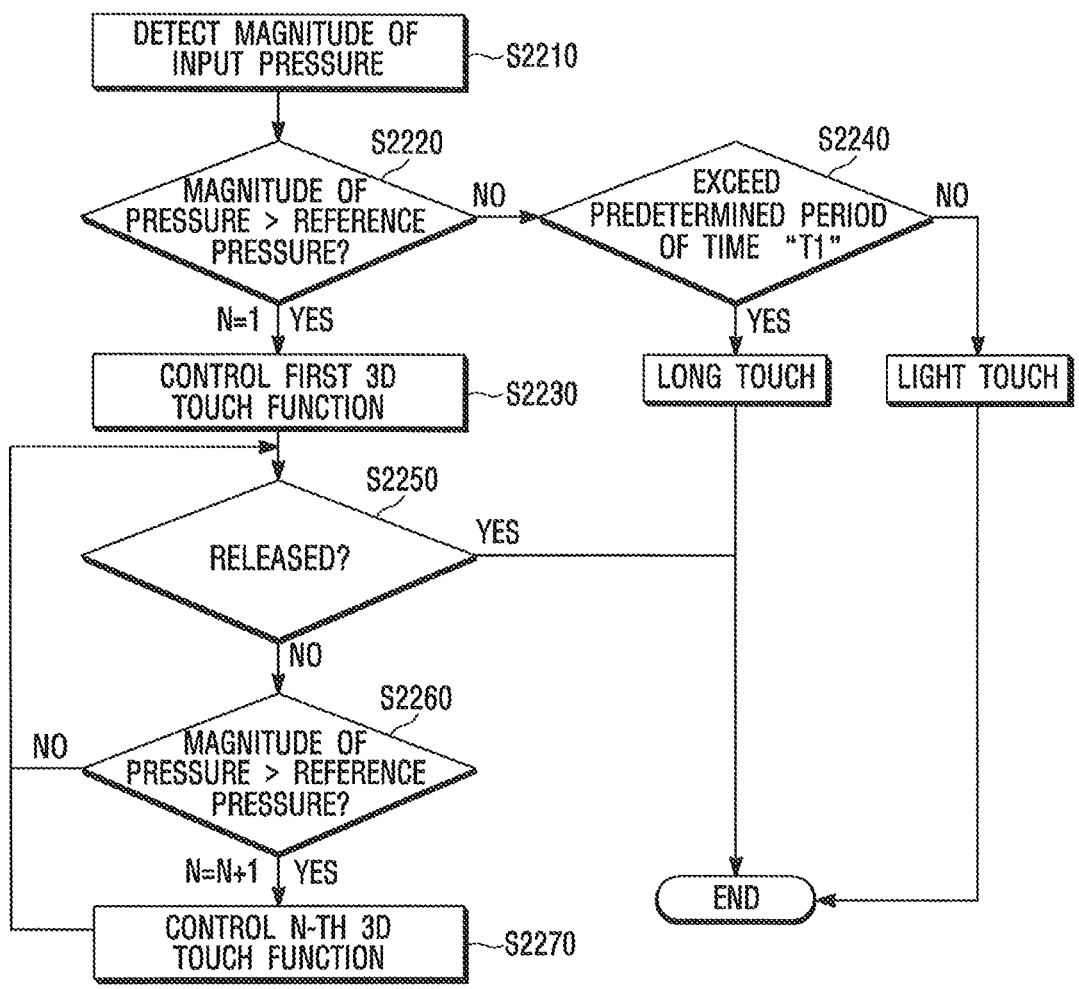
FIG. 22 is a flowchart for describing a force touch method of the touch input device according to the embodiment of the present invention.

Specifically, as shown in FIG. 22, the force touch method of the touch input device according to the embodiment of the present invention includes a step of detecting the magnitude of the input pressure (S2210), a step of comparing the detected magnitude of the pressure with the magnitude of the reference pressure (S2220), a step of controlling a first 3D touch function (S2230), and a step of controlling an N-th 3D touch function (S2250 to S2270). This will be described below with reference to FIGS. 7 and 22.

Figure 4:
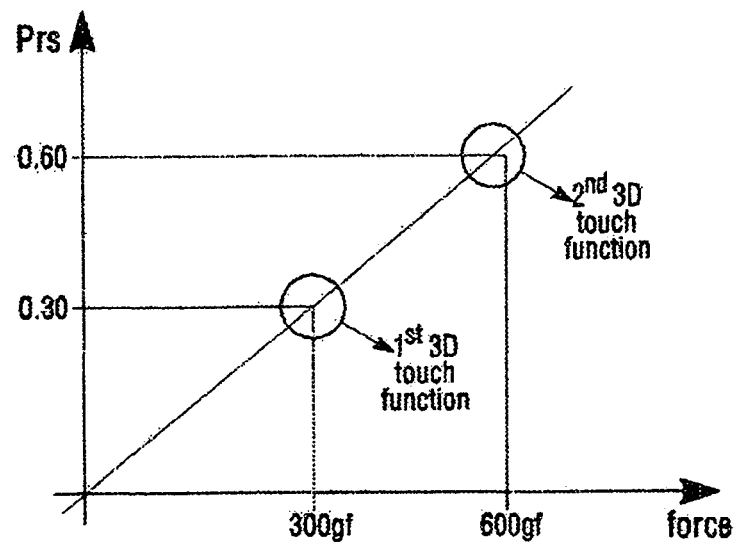
FIG. 4 is a force-pressure (prs) graph for describing the peek and pop function applied to the conventional smartphone shown in FIGS. 1 to 3
Figure 5:
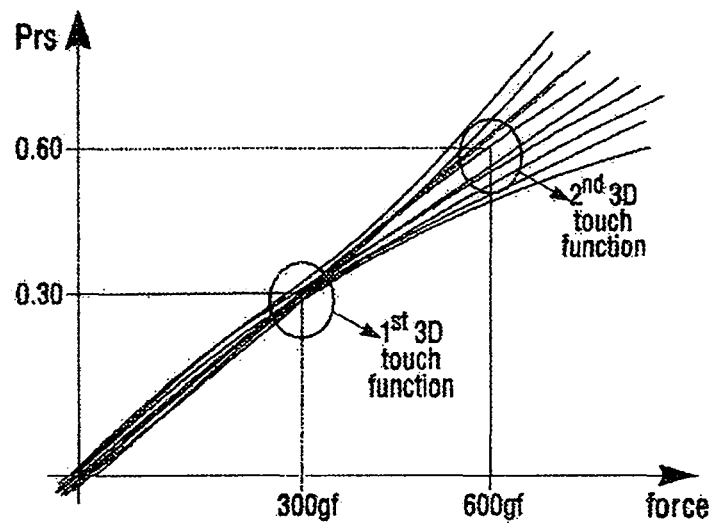
FIG. 5 and FIG. 6 are graphs for describing problems of the conventional peek and pop function.
Figure 6:
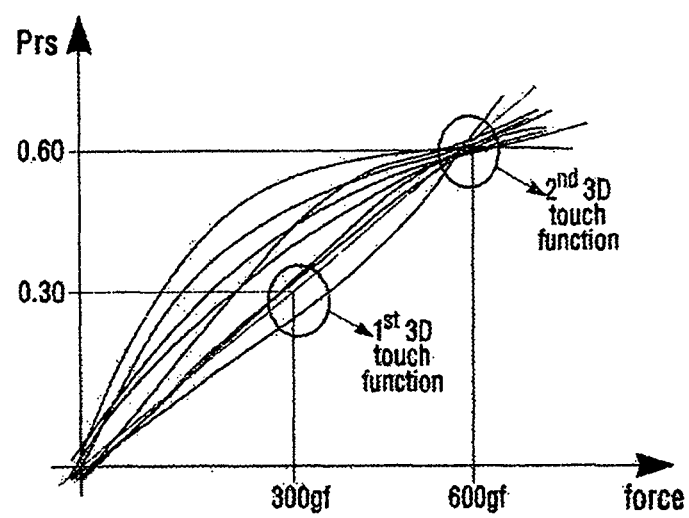

In step S2220 shown in FIG. 22, the controller 500 shown in FIG. 7 detects the magnitude of the pressure of the object, which is input to the touch input unit 100. The magnitude of the pressure of the object, which is input to the touch input unit 100, can be detected by the controller 500 from the sensing signal received from the electrodes of various embodiments of the touch input unit 100 shown in FIGS. 8 to 21. As shown in the graph of FIG. 4, the controller 500 may detect the magnitude of the pressure (Prs) corresponding to the force applied by the object.

In step S2220 shown in FIG. 22, the controller 500 shown in FIG. 7 compares the detected magnitude of the pressure with the magnitude of one predetermined reference pressure. More specifically, in step S2220, the controller 500 shown in FIG. 7 may determine whether or not the detected magnitude of the pressure increases from below the magnitude of the reference pressure to above the magnitude of the reference pressure. The value of the reference pressure may be predetermined by a manufacturer of the touch input device or may be changed into a new value according to the setting of the user of the touch input device. For example, the reference pressure may have a value corresponding to a reference force "F1" shown in the graph of FIG. 23. When the detected magnitude of the pressure is greater than the magnitude of the reference pressure, step S2230 is performed, and when is less than the magnitude of the reference pressure, step S2240 is performed.

In step 2230 shown in FIG. 22, when the magnitude of the pressure detected in step S2220 increases to above the magnitude of the reference pressure, the controller 500 shown in FIG. 7 controls such that the first predetermined 3D touch function is performed in the touch input device. Referring to FIG. 23, the fact that the detected magnitude of the pressure is greater than the magnitude of the reference pressure may mean that the force applied by the object to the touch input unit 100 shown in FIG. 7 is greater than the reference force "F1".

As an example of the first 3D touch function, when the detected magnitude of the pressure increases from below the magnitude of the reference pressure to above the magnitude of the reference pressure, the controller 500 may control, as shown in FIG. 2, such that the new window "W" is displayed on a portion of the display. That is, the controller 500 is able to display predetermined information on a portion of the display. Here, the predetermined information means a response of the application or touch input device to the portion where the object touches the touch input unit 100.

Figure 3:
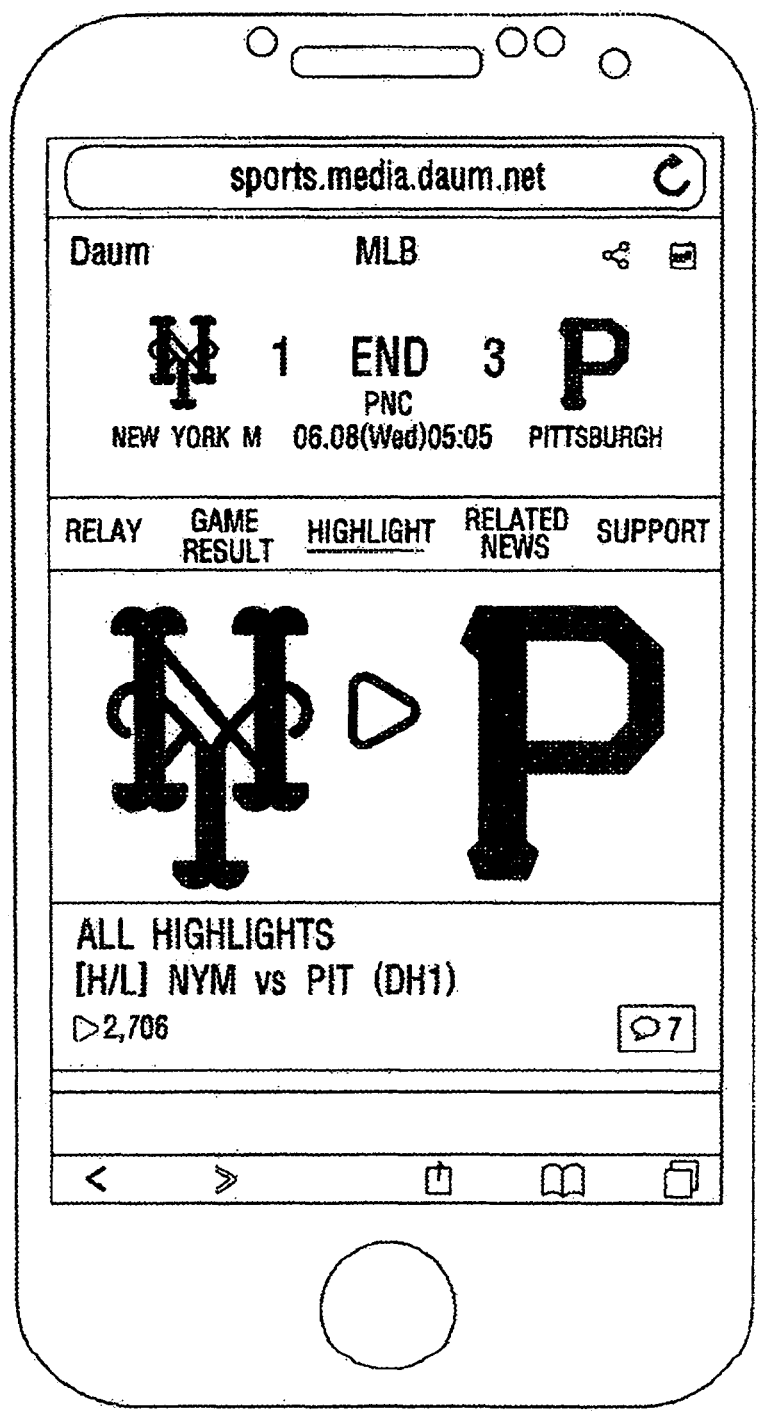
Figure 23:
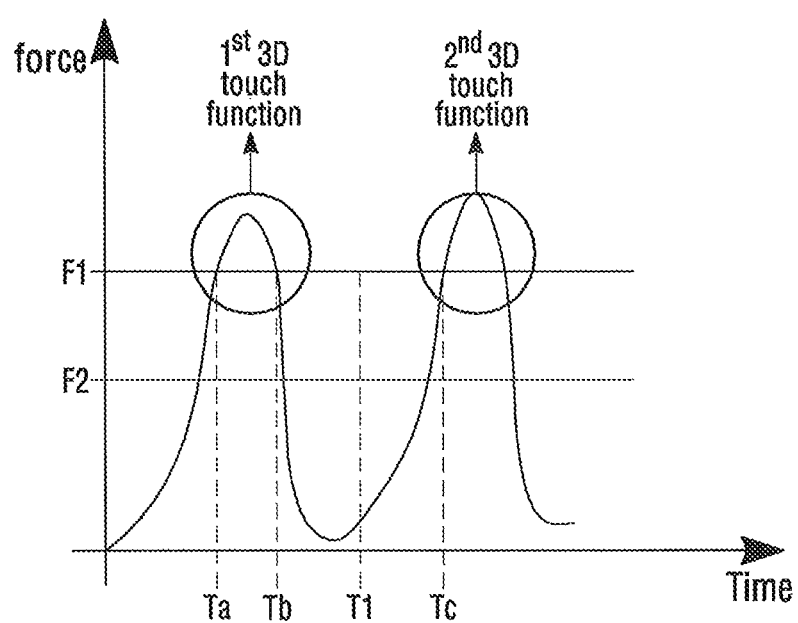
FIG. 23 is a force-time graph for describing the flowchart shown in FIG. 22.

In step S2240 shown in FIG. 22, in the state where the detected magnitude of the pressure is less than the magnitude of the reference pressure as a result of the comparison in step S2220, it is determined whether or not the touch time period of the object exceeds a predetermined period of time "T1" shown in FIG. 23. When the touch time period of the object exceeds the predetermined period of time "T1", the controller 500 shown in FIG. 7 determines the input of the object as the long touch. On the other hand, when the touch time period of the object is within the predetermined period of time "T1", the controller 500 determines the input of the object as the light touch or a tap touch. For example, when the detected magnitude of the pressure is less than the magnitude of the reference pressure, that is to say, the pressure of the object is less than the reference force "F1" shown in FIG. 23 and when the time touch period of the object is within the predetermined period of time "T1" shown in FIG. 23, the controller 500 determines the touch of the object as the light touch not the 3D touch, and can immediately control such that information shown in FIG. 3 is displayed on the display. Also, when the detected magnitude of the pressure is less than the magnitude of the reference pressure, that is to say, the pressure of the object is less than the reference force "F1" shown in FIG. 23 and when the time touch period of the object exceeds the predetermined period of time "T1" shown in FIG. 23, the controller 500 determines the touch of the object as the long touch, not the light touch, and can control such that information (e.g., application deletion indication) which is quite different from FIGS. 2 to 3 immediately after the lapse of the predetermined period of time "T1".

Step S2250 shown in FIG. 22 is performed after step S2230. Step S2250 is to determine whether or not the object is released from the touch input unit 100. Here, the fact that "the object is released from the touch input unit 100" means that a touch position signal of the object is not output from the touch sensor module 110 of the touch input unit 100. In other words, this means that the touch position of the object is not determined. Here, it may be determined that hovering means that the object is not released from the touch input unit 100. When the object is released from the touch input unit 100, that is to say, when the touch position signal of the object is not output from the touch sensor module 110, subsequent steps are terminated without being performed.

Step S2260 shown in FIG. 22 is performed in the state where the object is not released from the touch input unit 100 in step S2250. Step S2260 is to compare the detected magnitude of the pressure with the magnitude of the reference pressure. Here, the value of the reference pressure means the value of the reference pressure having the same magnitude as that of the reference pressure in step S2220. In step S2260, in the state where the object is not released from the touch input unit 100, it may be determined whether or not the detected magnitude of the pressure increases from below the magnitude of the reference pressure to above the magnitude of the reference pressure. In the state where the object is not released from the touch input unit 100, when the detected magnitude of the pressure does not increase from below the magnitude of the reference pressure to above the magnitude of the reference pressure, the controller 500 repeatedly performs steps S2250 and S2260. On the other hand, when increases, the controller 500 performs step S2270.

In step S2270 shown in FIG. 22, in the state where the object is not released from the touch input unit 100, when the detected magnitude of the pressure increases from below the magnitude of the reference pressure to above the magnitude of the reference pressure in step S2260, the controller 500 performs an N-th 3D touch function.

Here, N is a natural number and means the number for which the detected magnitude of the pressure increases from below the magnitude of the reference pressure to above the magnitude of the reference pressure in the state where the object is not released. Also, N is a natural number and means the number for which the detected magnitude of the pressure decreases less than the magnitude of the reference pressure, and then increases from below the magnitude of the reference pressure to above the magnitude of the reference pressure in the state where the object is not released. Therefore, in the state where the object is not released, when the number for which the detected magnitude of the pressure increases from below the magnitude of the reference pressure to above the magnitude of the reference pressure is two, the controller 500 controls such that a second 3D touch function is performed. When the number is three, the controller 500 controls such that a third 3D touch function is performed. When the number is N, the controller 500 controls such that the N-th 3D touch function is performed. Here, the second 3D touch function is different from the first 3D touch function of step S2230, and the third 3D touch function is also different from the first and second 3D touch functions. The N-th 3D touch function is also different from other 3D touch functions.

As an example of the second 3D touch function, in FIG. 23, at a time point "Tc" when the number for which the detected magnitude of the pressure increases from below the magnitude of the reference pressure to above the magnitude of the reference pressure is two, the controller 500 may control, as shown in FIG. 3 such that the predetermined information is displayed on the entire display.

Also, referring to FIG. 23, when the number for which the detected magnitude of the pressure increases from below the magnitude of the reference pressure to above the magnitude of the reference pressure is at least two, between a first time point "Ta" when the detected magnitude of the pressure increases from below the magnitude of the reference pressure to above the magnitude of the reference pressure and a second time point "Tc" when the magnitude of the pressure increases from below the magnitude of the reference pressure to above the magnitude of the reference pressure, the controller 500 may control such that a predetermined 3D touch function which was being performed prior to the first time point "Ta" is maintained as it is. Describing the above-taken example, the controller 500 may control such that the first 3D touch function in which the new window "W" continues to be displayed as shown in FIG. 2 on a portion of the display is performed between the first time point "Ta" and the second time point "Tc" at which the object is not released from the touch input unit 100.

Meanwhile, "Tb" in FIG. 23 means a time point when the detected magnitude of the pressure reduces from above the magnitude of the reference pressure to below the magnitude of the reference pressure. In the force touch method shown in FIGS. 22 to 23 according to the embodiment of the present invention, when the number for which the detected magnitude of the pressure increases from below the magnitude of the reference pressure to above the magnitude of the reference pressure is two during the outputting of the position signal of the object from the touch sensor module 110 of the touch input unit 100 shown in FIG. 7, the second 3D touch function is performed. Therefore, there exists the time point "Tb" when the detected magnitude of the pressure reduces from above the magnitude of the reference pressure to below the magnitude of the reference pressure.

"F2" in FIG. 23 is less than the reference force "F1" and is predetermined. For the comparison with the reference force "F1", the "F2" is referred to as an auxiliary reference force for the sake of convenience. The auxiliary reference force "F2" is intended to prevent the second 3D touch function not intended by the user from being generated. More specifically, during the outputting of the position signal of the object from the touch sensor module 110 of the touch input unit 100 shown in FIG. 7, after the detected magnitude of the pressure increases from below the magnitude of the reference pressure to above the magnitude of the reference pressure, the abnormal phenomenon in which the detected magnitude of the pressure increases from below the magnitude of the reference pressure to above the magnitude of the reference pressure may occur additionally at least once due to other reasons unrelated to the user's intention (e.g., user's pressure control failure, noise in the touch input device, etc.). However, so long as the controller 500 shown in FIG. 7 additionally sets the auxiliary reference force "F2", the above-described abnormal phenomenon can be blocked or alleviated.

When the detected magnitude of the pressure has never reduced to below the magnitude of an auxiliary reference force corresponding to the auxiliary reference force "F2" between at least two time points when the detected magnitude of the pressure increases to above the magnitude of the reference pressure corresponding to the reference force "F1", the controller 500 shown in FIG. 7 may control such that a 3D touch function different from the 3D touch function which has been performed at the earlier one of the two time points is not performed at later one of the two time points and the 3D touch function which has been performed at the earlier time point is maintained at the later time point. On the other hand, when the number for which the detected magnitude of the pressure reduces to below the magnitude of an auxiliary reference force corresponding to the auxiliary reference force "F2" is at least one between at least two time points when the detected magnitude of the pressure increases to above the magnitude of the reference pressure corresponding to the reference force "F1", the controller 500 may control such that the 3D touch function different from the 3D touch function which has been performed at the earlier time point is performed at the later one of the two time points.

Here, the auxiliary reference force "F2" is less than the reference force "F1". The auxiliary reference force "F2" may be set to a specific value by the manufacturer or user of the touch input device. Also, the auxiliary reference force "F2" may be automatically set to a specific value by the setting of the reference force "F1". For example, the auxiliary reference force "F2" may be automatically set to half or 70%, etc., of the set reference force "F1". Also, the auxiliary reference force "F2" is the same as the reference force "F1". Therefore, the auxiliary reference force "F2" is less than the reference force "F1", or is same as the reference force "F1".

As such, by using the force touch method of the touch input device according to the embodiment of the present invention, unlike the conventional peek and pop using two different two reference pressures, it is possible to perform two different 3D touch functions by using one reference pressure. Therefore, in the touch input device according to the embodiment of the present invention, it is enough as long as calibration is performed for only one reference pressure, so that it is possible to overcome the inconvenience that calibration should be performed for each reference pressure as in the conventional technology. Therefore, economic costs can be reduced and a calibration process time can be more reduced.

The force touch method of the touch input device according to the embodiment of the present invention shown in FIG. 22 can be applied to other various methods as well as the specific methods shown in FIGS. 2 to 3.

For example, according to the first 3D touch function in step S2230, the controller 500 may maintain the turned-off display of the touch input unit 100 as it is. According to the second 3D touch function in step S2270, the controller 500 may entirely or partially turn on the turned-off display of the touch input unit 100. Specifically, in a state where the touch input device operates and the display is turned off, when the user presses the surface of the touch input device at a pressure greater than the reference pressure at least twice without releasing, the display of the touch input unit may be entirely or partially turned on.

Here, during the performance of the second 3D touch function, the controller 500 may control such that a predetermined application is executed on the turned-on display. For example, the controller 500 may control such that a phone application or a weather application is executed.

For another example, according to the first 3D touch function in step S2230, the controller 500 may maintain a lock screen displayed on the display of the touch input unit 100 as it is. According to the second 3D touch function in step S2270, the controller 500 may execute a predetermined application on the display of the touch input unit 100. Specifically, in the lock screen, when the user presses the surface of the touch input device at a pressure greater than the reference pressure at least twice, the controller 500 may control such that a predetermined application other than the lock screen is executed on the display of the touch input unit 100.

As such, by using the force touch method of the touch input device according to the embodiment of the present invention, it is possible to perform two different 3D touch functions by using one reference pressure. Therefore, in the touch input device according to the embodiment of the present invention, it is enough as long as calibration is performed for only one reference pressure, so that it is possible to overcome the inconvenience that calibration should be performed for each reference pressure as in the conventional technology. Therefore, economic costs can be reduced and a calibration process time can be more reduced.

The features, structures and effects and the like described in the embodiments are included in an embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A method of a touch input device comprising a touch input unit and a controller, the method comprising:
   detecting a magnitude of a pressure of an object at a position, the magnitude being input to the touch input unit;
   performing, by the controller, a first three-dimensional (3D) touch function upon determining that the detected magnitude of the pressure of the object at the position increases from below a magnitude of a reference pressure to above the magnitude of the reference pressure; and
   performing, by the controller, an N-th 3D touch function upon determining that, while the pressure of the object at the position is not released, a determined number of times the detected magnitude of the pressure increases from below the magnitude of an auxiliary reference force to above the magnitude of the reference pressure is N, wherein N is a natural number greater than 1, wherein the magnitude of the auxiliary reference force is less than the magnitude of the reference pressure, and wherein the N-th 3D touch function is different from the first 3D touch function performed in the touch input device,
   wherein, when the magnitude of the pressure, while the pressure of the object at the position is not released, reduces from above the magnitude of the reference pressure to below the magnitude of the reference pressure and does not reduce to below the magnitude of the auxiliary reference force, the first 3D touch function is maintained.

2. The method of claim 1, wherein the first 3D touch function is a function in which the controller displays predetermined information on a portion of a display of the touch input unit, and wherein the N-th 3D touch function is a function in which the controller displays the predetermined information on the entire display of the touch input unit.

3. The method of claim 2, wherein the function in which the controller displays predetermined information on a portion of the display of the touch input unit is a peek function.

4. The method of claim 2, wherein the function in which the controller displays the predetermined information on the entire display of the touch unit is a pop function.

5. The method of claim 1, wherein the first 3D touch function is a function in which the controller maintains a turned-off display of the touch input unit as it is, and wherein the N-th 3D touch function is a function in which the controller entirely or partially turns on the turned-off display of the touch input unit.

6. The method of claim 5, wherein, in the N-th 3D touch function, the controller controls such that a predetermined application is executed on the turned-on portion of the display of the touch input unit.

7. The method of claim 1, wherein the first 3D touch function is a function in which the controller maintains a lock screen displayed on a display of the touch input unit, and wherein the N-th 3D touch function is a function in which the controller executes a predetermined application on the display of the touch input unit.

8. The method of claim 1, wherein the method is a force touch method.

9. The method of claim 1, wherein the reference pressure is a predetermined reference pressure.

10. The method of claim 1, wherein the first 3D touch function is a first predetermined 3D touch function.

11. A method of a touch input device, the method comprising:
   a) detecting a magnitude of a pressure of an object at a position;
   b) detecting a number of times, while the pressure of the object at the position is not released, the detected pressure magnitude increases from below a lower reference pressure magnitude to above a higher reference pressure magnitude;
   c) upon detecting that the number of times detected in step b) reaches 1, performing a first pressure touch function by a controller of the touch input device;
   d) upon detecting that the number of times detected in step b) reaches N, where N is a natural number greater than 1, performing an N-th pressure touch function by the controller; and
   e) upon detecting that the number of time detected in step b) reaches 1 but does not reach N, maintaining performance of the first pressure touch function.

\* \* \* \* \*